United States Patent
Steele et al.

(10) Patent No.: US 10,824,734 B2
(45) Date of Patent: *Nov. 3, 2020

(54) SYSTEM FOR RECURRING INFORMATION SECURITY THREAT ASSESSMENT

(71) Applicant: BANK OF AMERICA CORPORATION, Charlotte, NC (US)

(72) Inventors: David Michael Steele, Carrollton, TX (US); Jason Dean Vaughn, Jacksonville, FL (US); Mathew Allen Woodyard, Chicago, IL (US); Allan Carlton Byers, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/827,097

(22) Filed: Nov. 30, 2017

(65) Prior Publication Data

US 2019/0163915 A1    May 30, 2019

(51) Int. Cl.
*G06F 21/57* (2013.01)
*H04L 29/06* (2006.01)
*G06N 20/00* (2019.01)

(52) U.S. Cl.
CPC ........ *G06F 21/577* (2013.01); *H04L 63/1425* (2013.01); *H04L 63/1433* (2013.01); *H04L 63/20* (2013.01); *G06N 20/00* (2019.01)

(58) Field of Classification Search
CPC ............... G06F 21/577; H04L 63/1425; H04L 63/1433; H04L 63/20; G06N 20/00
See application file for complete search history.

(56) References Cited

U.S. PATENT DOCUMENTS

| | | |
|---|---|---|
| 6,418,436 B1 | 7/2002 | Degen et al. |
| 6,516,056 B1 | 2/2003 | Justice et al. |
| 6,925,443 B1 | 8/2005 | Baggett, Jr. et al. |
| 7,089,428 B2 | 8/2006 | Farley et al. |
| 7,290,275 B2 | 10/2007 | Baudoin et al. |
| 7,480,631 B1 | 1/2009 | Merced et al. |
| 7,552,480 B1 | 6/2009 | Voss |
| 7,873,732 B2 | 1/2011 | Chen et al. |
| 8,370,936 B2 | 2/2013 | Zuk et al. |
| 8,392,431 B1 | 3/2013 | Agassy et al. |
| 8,458,069 B2 | 6/2013 | Adjaoute |
| 8,606,712 B2 | 12/2013 | Choudhuri et al. |
| 8,635,695 B2 | 1/2014 | Zuk et al. |

(Continued)

*Primary Examiner* — Ali S Abyaneh
*Assistant Examiner* — Zoha Piyadehghibi Tafaghodi
(74) *Attorney, Agent, or Firm* — Michael A. Springs; Moore & Van Allen PLLC; Jeffrey R. Gray

(57) ABSTRACT

The invention utilizes a two-component system to detect third party security threats and drive improved security threat mitigation based on the detection. The first component of the system is a security threat assessment engine, which receives and/or identifies external data and internal data regarding third parties in order to determine information security threats posed by third parties. The second component of the system is an analytics engine, which may comprise a machine learning component which is configured to detect threat patterns and anomalies. In response to the detection of the threat patterns and anomalies the security threat assessment engine may be modified in order to more accurately determine security threats.

19 Claims, 4 Drawing Sheets

(56) References Cited

U.S. PATENT DOCUMENTS

| | | |
|---|---|---|
| 8,666,841 B1 | 3/2014 | Claridge et al. |
| 8,676,684 B2 | 3/2014 | Newman et al. |
| 8,725,597 B2 | 5/2014 | Mauseth et al. |
| 8,744,894 B2 | 6/2014 | Christiansen et al. |
| 8,752,170 B1 | 6/2014 | Newstadt et al. |
| 8,776,180 B2 | 7/2014 | Kumar et al. |
| 8,903,859 B2 | 12/2014 | Zeppenfeld et al. |
| 9,027,125 B2 | 5/2015 | Kumar et al. |
| 9,118,702 B2 | 8/2015 | MaCaulay |
| 9,130,937 B1 | 9/2015 | Ostermann et al. |
| 9,230,066 B1 | 1/2016 | Bailey et al. |
| 9,230,280 B1 | 1/2016 | Maag et al. |
| 9,275,291 B2 | 3/2016 | Shulman et al. |
| 9,282,092 B1 | 3/2016 | Shankar et al. |
| 9,319,419 B2 | 4/2016 | Sprague et al. |
| 9,438,615 B2 | 9/2016 | Gladstone et al. |
| 9,578,043 B2 | 2/2017 | Mawji et al. |
| 9,679,254 B1 | 6/2017 | Mawji et al. |
| 9,680,861 B2 | 6/2017 | Ward et al. |
| 9,699,209 B2 | 7/2017 | Ng et al. |
| 9,721,296 B1 | 8/2017 | Chrapko |
| 9,722,895 B1 | 8/2017 | Sarukkai et al. |
| 2005/0066195 A1 | 3/2005 | Jones |
| 2006/0031938 A1 | 2/2006 | Choi |
| 2006/0265746 A1 | 11/2006 | Farley et al. |
| 2008/0222706 A1 | 9/2008 | Renaud et al. |
| 2009/0024663 A1* | 1/2009 | McGovern ............ G06F 21/577 |
| 2013/0104236 A1* | 4/2013 | Ray .................... H04L 63/1433 |
| | | 726/25 |
| 2013/0304761 A1 | 11/2013 | Redlich et al. |
| 2013/0318580 A1 | 11/2013 | Gudlavenkatasiva et al. |
| 2014/0201836 A1 | 7/2014 | Amsler |
| 2014/0259130 A1 | 9/2014 | Li et al. |
| 2015/0073876 A1 | 3/2015 | Pieper et al. |
| 2015/0135325 A1* | 5/2015 | Stevens ............... H04L 63/1416 |
| | | 726/25 |
| 2015/0242619 A1* | 8/2015 | Bender ................ G06F 21/577 |
| | | 726/22 |
| 2016/0080399 A1 | 3/2016 | Harris et al. |
| 2016/0173509 A1 | 6/2016 | Ray et al. |
| 2016/0330219 A1* | 11/2016 | Hasan .................... G06N 20/00 |
| 2016/0371698 A1 | 12/2016 | Adler et al. |
| 2016/0373419 A1 | 12/2016 | Weigold et al. |
| 2017/0061129 A1 | 3/2017 | Bektchiev et al. |
| 2017/0140312 A1 | 5/2017 | Pai et al. |
| 2017/0244740 A1 | 8/2017 | Mahabir et al. |
| 2017/0251013 A1 | 8/2017 | Kirti et al. |
| 2017/0310708 A1 | 10/2017 | Schiappa et al. |
| 2017/0324768 A1* | 11/2017 | Crabtree ............ H04L 63/1441 |
| 2017/0346846 A1* | 11/2017 | Findlay ............... H04L 63/1441 |
| 2018/0089449 A1 | 3/2018 | Boudreau et al. |
| 2018/0103055 A1 | 4/2018 | Keohane et al. |
| 2018/0375877 A1 | 12/2018 | Jakobsson et al. |
| 2019/0166154 A1* | 5/2019 | Steele ................ H04L 63/1408 |

* cited by examiner

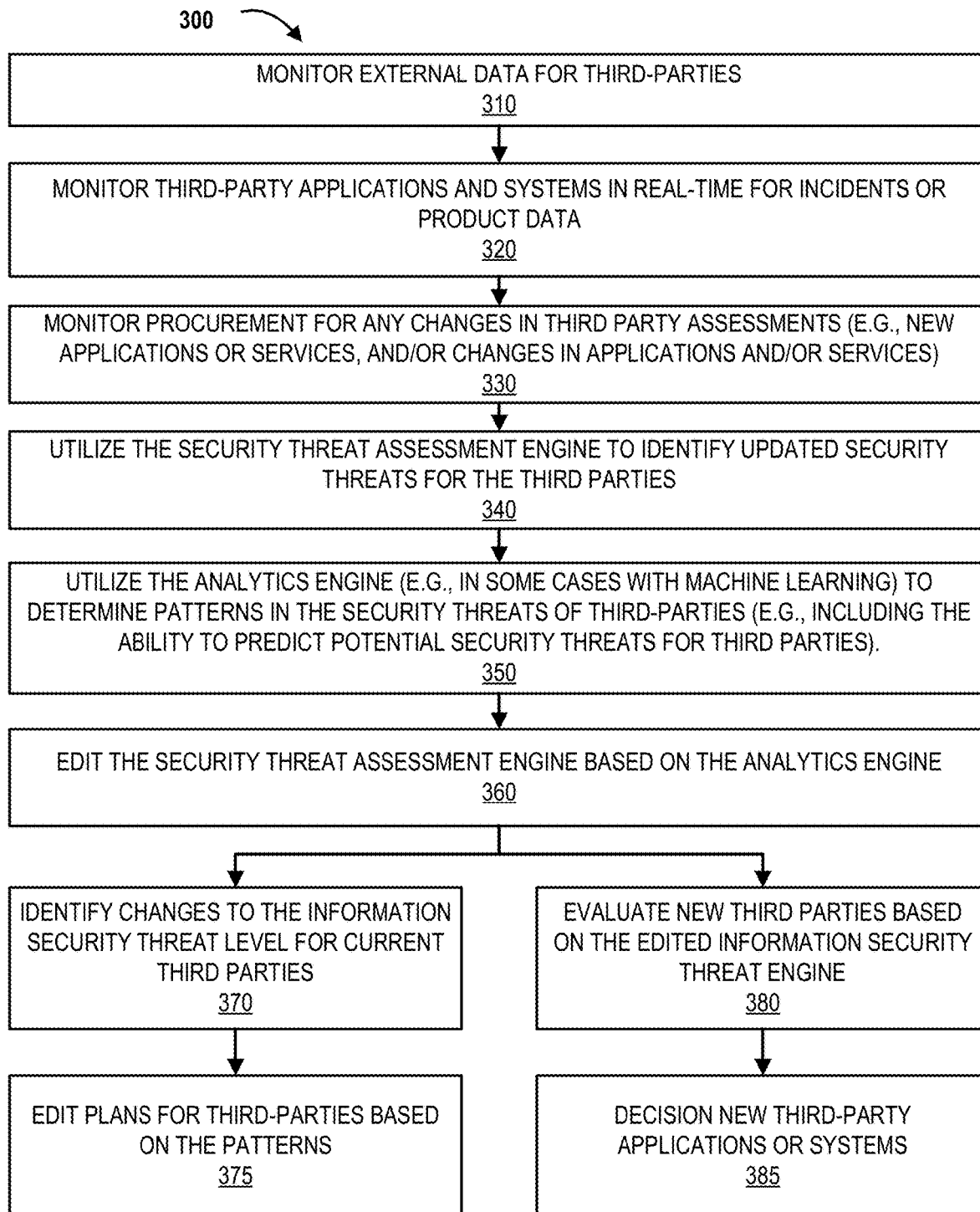

SYSTEM FOR RECURRING INFORMATION SECURITY THREAT ASSESSMENT

FIELD

The present invention embraces a system, computer program product, and computer-implemented method for detecting and analyzing information security threats stemming from third parties.

BACKGROUND

In the information security context, an entity may commonly rely on third parties, such as third party systems and applications, to operate at least a portion of its various processes. As a result, security issues and vulnerabilities which could compromise the third party, such as the third party systems and applications, may in turn create a security threat to the entity (e.g., the entity's systems or applications, processes, and/or data). Accordingly, there is a need for improved security technology.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The invention utilizes a two-component system to detect third party security threats and drive internal system processes based on the detection. The first component of the system is a security threat assessment engine, which receives and/or identifies external data and internal data regarding third parties in order to determine information security threats posed by third parties (e.g., the third parties themselves, the operations of the third parties, the applications provided by the third parties to the entity, or the systems provided by the third parties that are utilized by the entity). Based on the external and internal data, the security threat assessment engine may determine security threats, security threat information, and/or a security threat level. The second component of the system is an analytics engine, which may comprise a machine learning component which is configured to detect threat patterns and anomalies. In response to the detection of the threat patterns and anomalies the security threat assessment engine may be modified in order to more accurately determine security threats, security threat information, and/or provide a security threat level for various third parties.

Embodiments of the invention comprise systems, computer implemented methods, and computer program products for information security threat assessments for allowing an entity to determine information security threats of third parties. The invention comprises identifying external data for a third party, wherein the external data comprises at least third party security threat data for the third party from an external data source, and wherein the external data is received from an external data source system. The invention further comprises identifying internal data for the third party. The internal data comprises third party product data for the third party, incident data related to the third party, and assessment data from an assessment of the third party. The invention further comprises determining one or more security threats for the third party based on the external data and the internal data.

In further accord with embodiments of the invention, the one or more security threats for the third party comprise at least an information security threat level for the third party based on the external data and the internal data.

In other embodiments of the invention, the invention further comprises determining an information security threat plan based on the one or more security threats, wherein the information security threat plan comprises at least an assessment type and an assessment frequency for future assessments.

In yet other embodiments of the invention, the assessment type may include a self-assessment, an online assessment, or an onsite assessment.

In still other embodiments of the invention, the information security threat plan further comprises security controls for implementation by the third party to mitigate the one or more security threats.

In further accord with embodiments of the invention, the third party security threat data is determined by the external data source from Internet traffic of the third party.

In other embodiments of the invention, the third party product data for the third party comprises a scan of the third party product.

In yet other embodiments of the invention, the third party product data for the third party comprises an allowed compromise of the third party product.

In still other embodiments of the invention, the incident data related to the third party comprises a number of the incidents and a severity of the incidents associated with the third party.

In further accord with embodiments of the invention, the assessment data from the assessment of the third party comprises the assessment data for one or more past assessments of the third party.

In other embodiments of the invention, the one or more past assessments comprise a determination of the one or more security threats based on responses to assessment inquiries regarding security of the third party.

In yet other embodiments, the invention further comprises receiving a request to determine the one or more security threats for the third party, wherein the request is received pre-interaction with the third party, post-interaction with the third party, pre-assessment scheduling, pre-assessment support, post-assessment support, remediation support, assessor evaluation, or business decision support.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
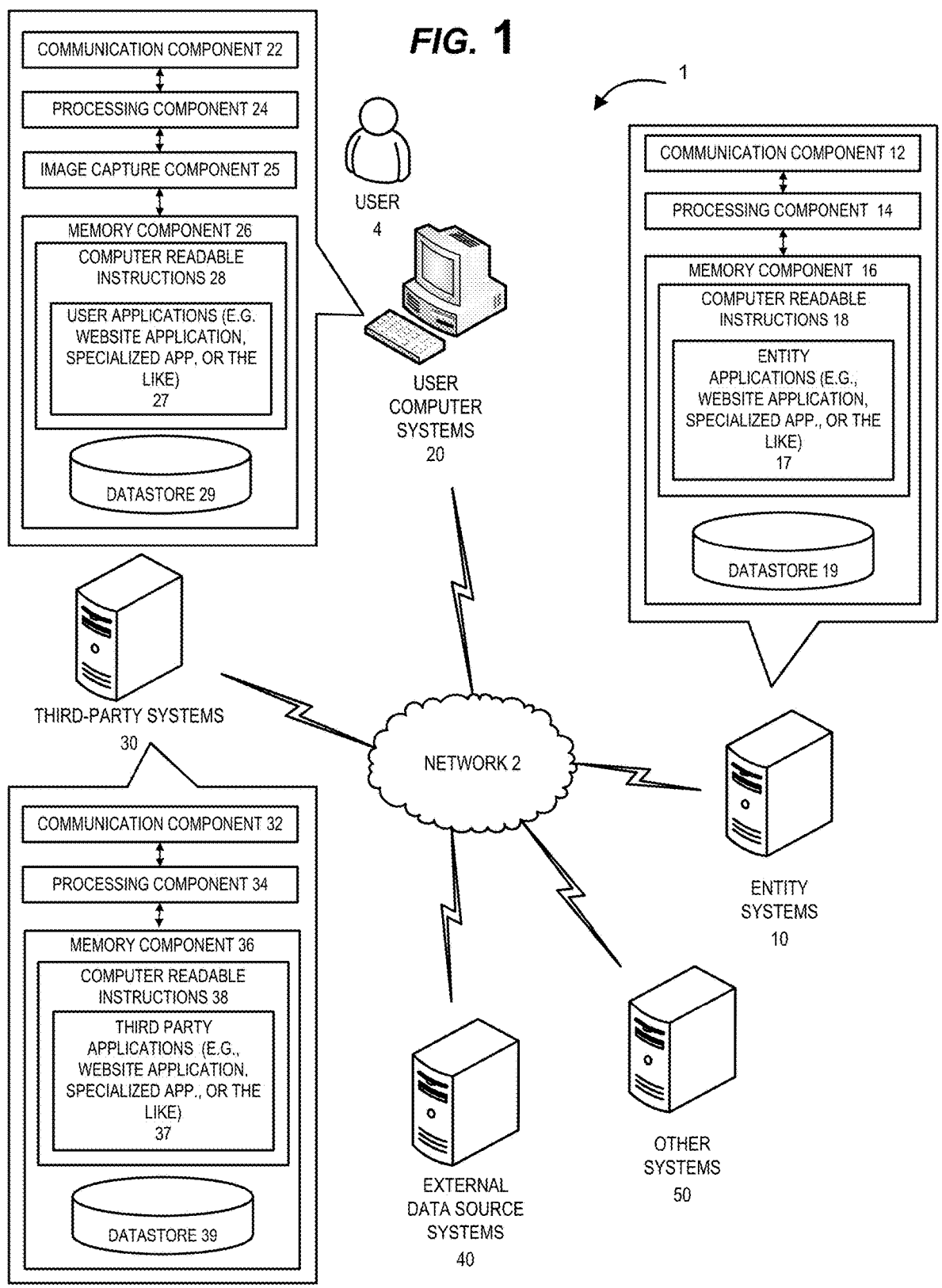

Having thus described embodiments of the invention in general terms, reference will now be made to the accompanying drawings, and wherein:

FIG. 1 illustrates a block diagram of a threat assessment and analytics system environment, in accordance with embodiments of the invention.

Figure 2:
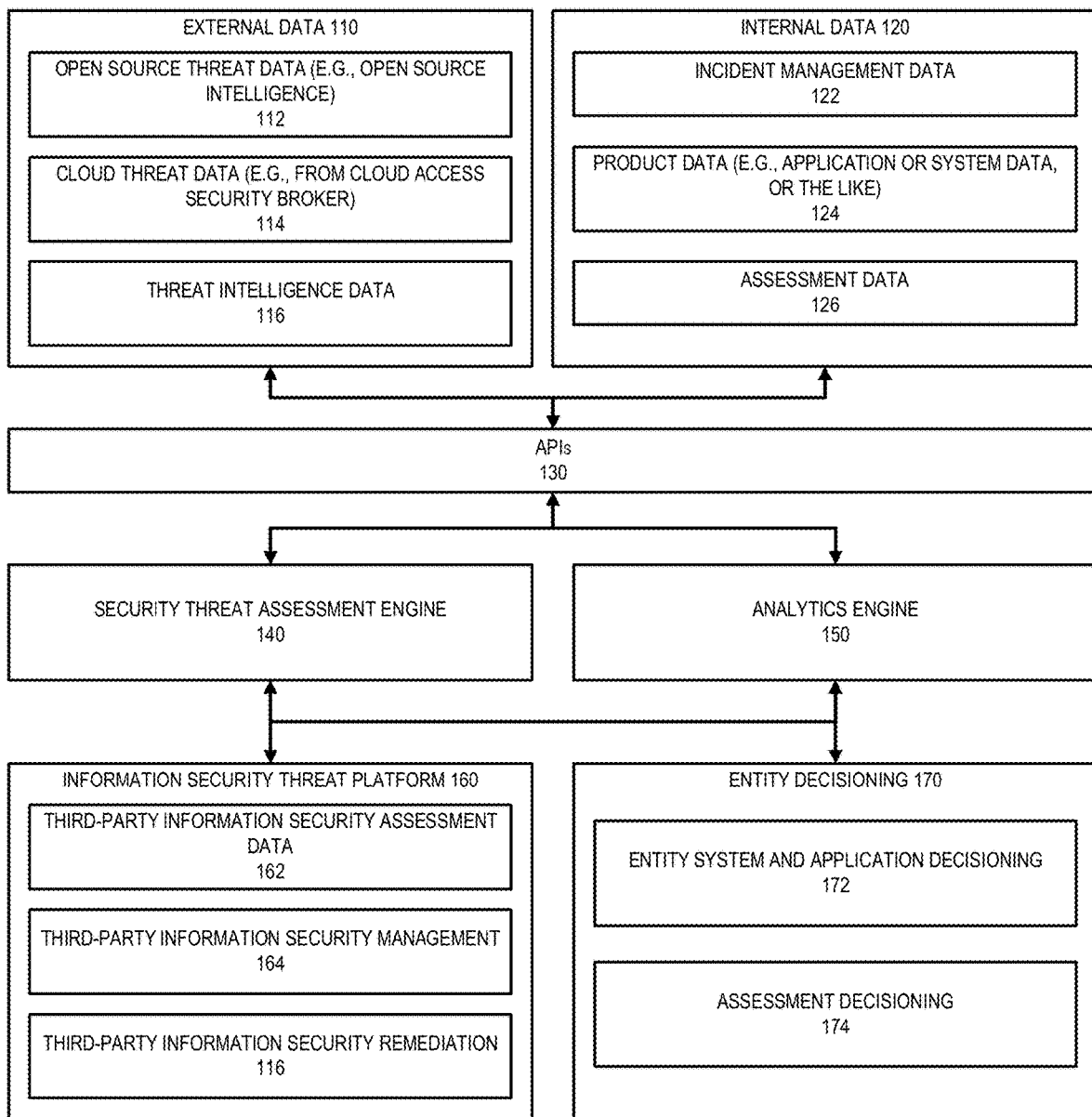

FIG. 2 illustrates a flow of information to and from the security threat assessment engine and the analytics engine, in accordance with embodiments of the invention.

Figure 3:
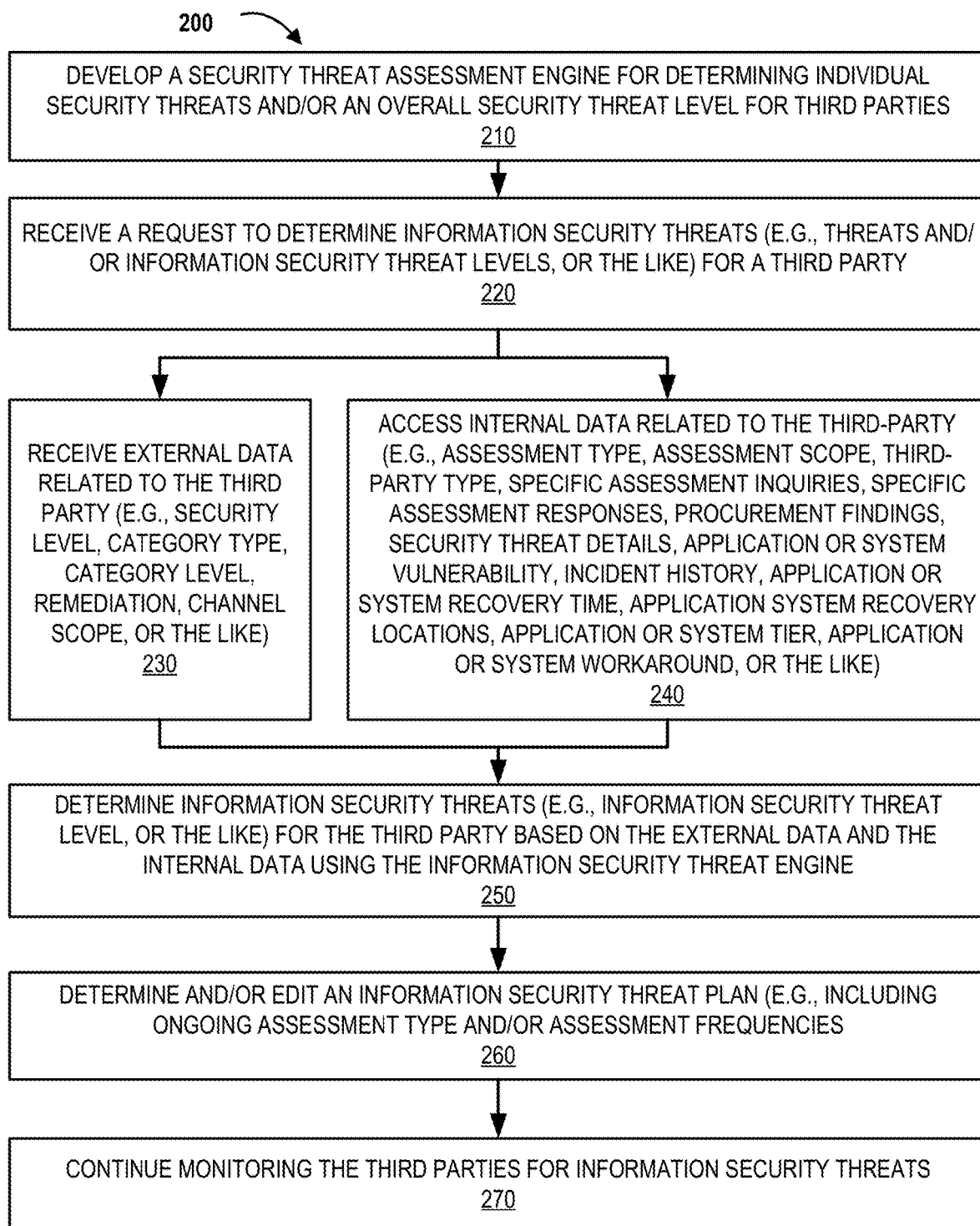

FIG. 3 illustrates a process flow for utilizing the security threat assessment engine, in accordance with embodiments of the invention.

FIG. 4 illustrates a process flow for utilizing the analytics engine, in accordance with embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

The invention utilizes a two-component system to detect third party security threats and drive processes and security controls based on the detection. The first component of the system is a security threat assessment engine, which identifies and/or receives external and internal data regarding third parties in order to determine information security threats posed by third parties (e.g., the third parties themselves, the operations of the third parties, the applications provided by the third parties to the entity, or the systems provided by the third parties that are utilized by the entity). Based on the external and internal data, the security threat assessment engine may determine security threats, security threat information, and/or a security threat level. The second component of the system is an analytics engine, which may comprise a machine learning component which is configured to detect threat patterns and anomalies. In response to the detection of the threat patterns and anomalies the security threat assessment engine may be modified in order to more accurately determine security threats, security threat information, and/or provide a security threat level for various third parties.

It should be understood that the present invention improves traditional security threat systems by not only utilizing internal data regarding applications and/or systems of third parties, but also by accessing external data from outside data sources in order to supplement the internal data that is available to the entity. The combination of the internal and external data is utilized to more accurately identify potential security threats of a third party that may supply products to the entity. The present invention also is able to predict how likely the security threats identified will result in an incident in the future. Moreover, the determination of the security threats helps the entity to determine plans for mitigating and/or eliminating the security threats by implementing security controls. Furthermore, continuous monitoring of the security threats (e.g., based on continuous monitoring of the external and/or internal data) allows the entity to make decisions regarding how to mitigate potential incidents and/or whether or not to take specific actions with respect to third parties. The present invention allows for real-time management of security threats and implementation of security controls in order to prevent potential incidents (e.g., misappropriation of data by compromising entities, loss of confidential information, or the like). The present invention is an improvement over traditional systems because of the use of the external data, and the real-time monitoring of the security threats, which results in more accurate determination of security threats and more efficient mitigation of such security threats.

It should be further understood that changes in the external data and internal data, as well as the resulting changes in the security threats, may be monitored over time in order to improve upon the accuracy of the determination of the security threats. For example, the monitoring may allow for the determination of patterns in the accuracy of identifying security threats that results in the reduction of the occurrence of incidents. Moreover, the monitoring may help to determine patterns in the correlation between the individual assessment inquires related to the security threats with the actual incidents in order to determine if the right assessment inquiries are being made and the right security controls are being implemented. The present invention may also be utilized to examine the assessments of various assessors in order to determine if particular assessors are acceptable at identifying some security threats, but not others, in order to improve training for the assessors (e.g., for types of security assessment, the assessment process, or the like), shifting assessors to assessing different third parties, and/or to updating the assessments inquiries.

FIG. 1 illustrates a threat assessment and analytics system 1, in accordance with embodiments of the invention. As illustrated in FIG. 1, one or more entity systems 10 are operatively coupled, via a network 2, to one or more user computer systems 20, one or more third party systems 30, one or more external data source systems 40 and/or one or more other systems 50. In this way, third parties may be analyzed for security threats using both external and internal data, and analytics may be utilized to improve the analysis of the third parties for security threats, as will be described throughout the disclosure.

The one or more entity systems 10 may allow associated users 4 to perform information security threat assessments of third parties (e.g., the third parties themselves, third party systems, and/or third party applications) and/or utilize analytics and machine learning related to the information security threat assessments to improve upon the information security threat assessments. The one or more entity systems 10 may allow for the performance of these tasks through communication with the one or more user computer systems 20, the one or more third party systems 30, the one or more external data source systems 40, and/or the one or more other systems 50 through the network 2. The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/ or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the one or more user systems 20, the one or more third party systems 30, the one or more external data source systems 40, and/or the one or more other systems 50. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more entity systems 10 comprise computer-readable instructions 18 stored in the memory component 16, which in one embodiment includes the computer-readable instructions 18 of the one or more entity applications 17 (e.g., website applications, dedicated applications, internal applications, or the like). In some embodiments, the one or more memory components 16 include one or more data stores 19 for storing data related to the one or more entity systems 10, including, but not limited to, data created, accessed, and/or used by the one or more entity applications 17. The one or more entity applications 17 may be utilized to identify internal data of third parties, capture external data from one or more external data sources, perform security threat assessments on the third parties, and utilize analytics to improve upon the security threat assessments.

As illustrated in FIG. 1, one or more user computer systems 20 are utilized by users 4 to access the one or more entity systems 10, the one or more third party systems 30, the one or more external data source systems 40, and/or one or more other systems 50 to facilitate users 4 reviewing the information security threats of third parties and/or the analytics associated therewith. It should be understood that the one or more user computer systems 20 may be a desktop, mobile device (e.g., laptop, smartphone device, PDA, tablet, or other mobile device), or any other type of computer that generally comprises one or more communication components, one or more processing components, and one or more memory components. The one or more user computer systems 20 may generally comprise one or more communication components 22, one or more processing components 24, and one or more memory components 26. The one or more processing components 24 may include functionality to operate one or more software programs based on computer-readable instructions 28 thereof, which may be stored in the one or more memory components 26.

The one or more processing components 24 are operatively coupled to the one or more communication components 22 and the one or more memory components 26. The one or more processing components 24 use the one or more communication components 22 to communicate with the network 2 and other components on the network 2, such as, but not limited to, the one or more entity systems 10, the one or more third party systems 30, the one or more external data sources 40, and/or the one or more other systems 50. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components may include a keypad, keyboard, touch-screen, touchpad, microphone, mouse, joystick, other pointer component, button, soft key, and/or other input/output component(s) for communicating with the other systems.

As illustrated in FIG. 1, the one or more user computer systems 20 may have computer-readable instructions 28 stored in the one or more memory components 26, which in one embodiment includes the computer-readable instructions 28 for one or more user applications 27, such as dedicated applications (e.g., apps, applet, or the like), portions of dedicated applications, websites, or other apps that allow the users 4 to take various actions, including allowing the users 4 to access applications located on other systems, or the like, to perform steps and/or review the results of the processes discussed herein. In some embodiments, the one or more users 4 utilize the one or more user computer systems 20 to communicate with the one or more entity systems 10, the one or more third party systems 30, and/or the one or more external data source systems 40 in order to allow the one or more users 4 to determine information security threats of third parties and/or determine analytics thereof utilizing a security threat assessment engine and/or an analytics engine.

As illustrated in FIG. 1, one or more third party systems 30 may communicate with the one or more entity systems 10, the one or more user computer systems 20, the one or more external data source systems 40, and/or the one or more other systems 50 in order allow for access to external assessment information. As such, the one or more third party systems 30 are operatively coupled, via a network 2, to the one or more entity systems 10, the one or more user computer systems 20, the one or more external data source systems 40, and/or the one or more other systems 50. The one or more third party systems 30 generally comprise one or more communication components 32, one or more processing components 34, and one or more memory components 36. The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the one or more entity systems 10, the one or more user computer systems 20, the one or more external data source systems 40, and/or the one or more other systems 50. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more third party systems 30 may have computer-readable instructions 38 stored in the one or more memory components 36, which in one embodiment includes the computer-readable instructions 38 of one or more third party applications 37, such as dedicated applications (e.g., apps, applet, or the like), portions of dedicated applications, websites, or other apps that allow for communication with the one or more users 4 and/or the one or more entities regarding the services (e.g., applications, systems, or the like) that the third parties may provide to the one or more entities, as will be described herein. It should be understood, when third party is used herein, unless otherwise specified, the third party may include the third party itself, the systems and applications offered by the third party, the systems or applications utilized by the third party, and/or other third party information.

Moreover, as illustrated in FIG. 1, the one or more external data source systems 40 and/or the one or more other systems 50 may be operatively coupled to the one or more entity systems 10, the one or more user computer systems 20, and/or the one or more third party systems 30, through the network 2. The one or more external data source systems 40 and/or the one or more other systems 50 have components the same as or similar to the components described with respect to the one or more entity systems 10, the one or more user computer systems 20, and/or the one or more third party systems 30 (e.g., one or more communication components, one or more processing components, and one or more memory devices with computer-readable instructions of one or more applications, one or more datastores, or the like). The one or more external data source systems 40 may provide external data, such as security threat information, third party assessment data, third party security threat levels, or the like to the one or more entities to aid in providing data for the security threat assessment conducted by the entity. Thus, the one or more external data source systems 40 and/or the one or more other systems 50 communicate with the one or more entity systems 10, the one or more user computer systems 20, and/or the one or more third party systems 30 in same or similar way as previously described with respect to the one or more entity systems 10, the one or more user computer systems 20, and/or the one or more third party systems 30.

FIG. 2 provides a block diagram illustrating the flow of information through the various systems that are utilized to develop and use the security threat assessment engine 140 and/or the analytics engine 150. The flow of information, and the use of the security threat assessment engine 140 and/or the analytics engine 150 to determine security threats (e.g., including an information security threat level, or the like) and to improve upon the security threat assessment process, will be described in further detail with respect to FIGS. 3 and 4.

FIG. 3 illustrates a process flow for utilizing a security threat assessment engine 140, in accordance with embodiments of the invention. As illustrated by block 210 in FIG. 3 a security threat engine is developed by the entity in order to assess security threats of third parties, such as the third party products (e.g., goods and services) that the entity utilizes from the third parties within the systems and/or applications of the entity. For example, the entity may utilize processes, systems, and/or applications of the third party (e.g., that the third party hosts or that are provided to the entity for installation), such as applications (e.g., programs, processes, or the like) and/or systems (e.g., storage, devices, components, or the like), which may or may not have access to and/or store confidential information (e.g., user information, business information, monetary information, or the like) of the entity and/or customers of the entity. In some instances the entity may utilize thousands of products from various third parties. The security threat assessment engine is developed to identify potential security threats, such as by identifying particular security threats associated with a third party (e.g., individual third party security threats) and/or determining one or more security threat levels for the third party (e.g., an overall assessment of the security threat of the third party), as will be described in further detail herein.

As illustrated, in FIG. 2 the security threat assessment engine 140 may be developed based on external data 110 it receives from external sources (e.g., an external data source system 40) and/or internal data 120 it captures from within the entity systems 10, in order to identify one or more security threats from each of the third parties. As illustrated by block 130 in FIG. 2, the external data 110 and the internal data 120 may be received through one or more APIs 130, which allows the external data source systems 40 and/or the entity systems 10, and the applications and systems associated therewith, to interact with the information threat assessment engine 140 and/or the analytics engine 150, through different systems and/or applications. The security threat assessment engine 140 and/or the analytics engine 150 may be utilized to develop and deploy third party information security controls through an information threat security platform 160 and/or to improve entity decisioning in an entity deaccessioning platform 170.

It should be understood that the external data 110 may include different types of external third party threat data, such as open source threat data 112, cloud threat data 114, and threat intelligence data 116, or the like. The open source threat data 112 (e.g., open source intelligence ("OSINT") data) may include various data that is monitored by an external data source. For example, the open source data may be a summary threat level of third parties based on the information that the external data source has on the third parties. The open source data 112 may be based on a category type of the third parties (e.g., type of business in which the third party is involved), such as the products that the third parties offer and the information to which the third parties have access. The open source data 112 may further include remediation data, such as the how are potential threats dealt with by the third party. The cloud threat data 114 (e.g., a cloud access security broker ("CASB") data) may be similar to the type of data associated with the open source threat data 112, but it may be specific to data related to the cloud services that the third parties may utilize. As such, the cloud threat data 114 may include summary security threat levels of the third parties for the cloud related activities, a category type associated with the cloud related activities, and/or remediation data associated with the cloud related activities. The open source threat data 112 and cloud threat data 114 may be identified and utilized separately because different entities may provide the associated products and each may have different security threats associated therewith.

The external data 110 may also include threat intelligence data 116, which may relate to publicly available information, such as news, trade information, or other publicly accessed information that may indicate potential security threats associated with particular third parties.

It should be understood that the external data 110 received from the external data source systems 40 may be information to which the one or more entities currently do not have access. For example, the external data source systems 40 may monitor communications over the Internet with the third parties, and thus, the external data source systems 40 may monitor the number of communications with the third parties, the type of communications, the requests within the communications (e.g., required authentication, number of authentication factors, such as one, two, three, or the like). Additionally, the external data sources may have access to other information regarding incidents, assessments, or the like that the entity does not have, and thus, may provide a different view of the security threats associated with the third parties. Moreover, different external data sources may have different information about third parties, and thus, it may be beneficial to access external data 110 from different external data sources. For example, one external data source may define one third party as having a security threat level that is low, while another external data source may define the same third party as having a security threat level that is high because it has access to incident data that the first party many not have.

The internal data 120 may include incident management data 112, which is related to any incidents that may be associated with a system and/or application provided by the third party that is utilized by the entity (e.g., hosted by the third party and/or hosted by the entity). For example, the incident may be an actual security event, such as misappropriated data, exposure of confidential information, successful unauthorized access by another party (e.g., not the third party and not the entity), or other like incident that could have resulted in an actual security event (e.g., unsuccessful unauthorized access attempt, or the like). The internal data 120 may further include application and/or system data 124, which is related to the operation and/or use of the applications and/or systems of the third parties. For example, the application and/or system data 124 may include how the application and/or system is utilized within the entity, such as what information does is store (e.g., anonymous information, personal information), how the application and/or system operates (e.g., how the information is stored, how a user accesses the information), what other applications and/or systems communicate with the third party applications and/or systems (e.g., how many different ways is the information accessed and/or distributed). The internal data 120 may further include assessment data 126, which relates to different types of assessments that were performed on the third party (e.g., the third party itself, the third party processes, the third party applications, and/or the third party systems). Different types of assessments may include self-assessments provided by the third party to the entity, online assessments provided by the entity to the third party, and/or onsite assessments for which a user 4 associated with the entity travels to the third party to review the third party processes, its applications, and/or its systems. The assessment data 126 may further include a frequency of assessments indicating how often a third party should be assessed and what type of assessment should be used (e.g., onsite assessment once a year and online assessments three times a year, or the like).

Returning to FIG. 3, as illustrated in block 220, a request is received to determine one or more security threats, such as specific security threats, an information security threat level, or the like for a third party. It should be understood that the request may occur at any time. For example, the request for the determination of the one or more security threats may be received pre-interaction with the third party, such as before entering into an agreement with the third party in order to determine any potential security threats before entering the agreement with the third party. The request may also occur post-interaction with the third party, such as after signing the agreement with the third party in order to identify potential security threats that should be monitored during implementation and/or operation of the systems and/or applications provided by the third party. The request may also occur pre-assessment scheduling, such as before an assessment is scheduled in order to determine potential security threats which may help to determine the type of assessment (e.g., self, online, in person, or the like), when the assessment should occur, as well as to give some insight to users 4 (e.g., assessors, or the like) regarding on what to concentrate the review during an assessment. Alternatively, the request may occur during post-assessment support, such as after the assessment occurs in order to try to match any assessment findings with security threats identified using the information threat assessment engine 140. The request may also occur during remediation support, such as in order to aid in identifying security threats to remediate, and/or determine if such remediation has reduced the security threats. In other embodiments, the request may occur at any time to determine if a user 4 (e.g., assessor, or the like) has any gaps in assessments over the lifecycle of the user's assessments. In some embodiments, the request may occur before business decisions are made in order to determine security threat levels that may aid in making the business decisions. It should be further understood that the request can be made whenever a user wants to determine a security threat level for any third party at any time. In some embodiments the security threat level may be determined automatically and continuously in real-time, or automatically at particular intervals (e.g., daily, weekly, monthly) in order identify any changes in the information security threats over time.

As illustrated by blocks 230 and 240 in FIG. 3, after a request to determine security threats for a third party is received, external data 110 is received and internal data 120 is accessed. As illustrated in block 230 the external data 110, as previously described above, is received from more or more external data sources. The external data 110 may be related to the third party and may include potential individual security threats (e.g., specific threats that the external source knows about), a security threat level (e.g., as determined by an external data source), a third party category type (e.g., may determine scrutiny of third party assessments), a third party category level (e.g., relative threat with other third parties), remediation (e.g., how easily the security threats may be remediated), channel scope (e.g., how the third party applications and/or systems are accessed), or the like as previously discussed herein.

As illustrated in block 240 the internal data 120, as previously described herein, is accessed from within the entity systems 10. The internal data 120 is related to the third party and may include internal assessment data (e.g., assessment type, assessment scope, specific assessment inquires, specific assessment responses, or the like), incident details (e.g., third party application or system vulnerability, incident details, incident frequency, incident severity level, or the like), third party procurement findings (e.g., findings from internal procurement of products from third parties), remediation (e.g., recovery time, recovery objective, potential workarounds, or the like), or the like.

FIG. 3 further illustrates in block 250 that the security threats are determined based on the external data and the internal data using the information security threat engine 140. In some embodiments, the security threats may include individual security threats that are provided by the external data 110 and/or internal data 120. These may include specific threats that are explicitly provided by the external data source or identified by the assessors. Alternatively, specific security threats may not have been identified, but instead can be inferred from a combination of the external and/or internal data. For example, no incidents have occurred within the entity, but the external data may indicate that other parties may have had incidents for a particular application and/or system utilized by the entity. Moreover, in some embodiments an information security threat level is determined in order to identify a security threat level for a plurality of third parties in order to allow the entity to prioritize the development or editing of the security threat plans for the most significant third party threats.

The security threats to the third party may include, but are not limited to, potential access to confidential information of the entity, potential significant downtime for the applications and/or systems, potential loss of entity data (e.g., confidential entity data and/or customer information), or other like security threats which will be discussed in further detail herein. Moreover, not only may the security threats be identified, but the security threat assessment engine 140 may also determine the potential frequency of the security threats, the vulnerability of the applications and/or systems (e.g., different levels for the security threats), the frequency of potential losses that might occur due to the occurrence of a loss event that results from the security threats (e.g., one-time loss, ongoing loss, or the like), the magnitude of the potential loss due to the occurrence of a loss event that results from the security threats (e.g., small financial losses, large financial losses, loss of goodwill of the entity name, loss of the ability to operate, or the like), or the like, one or more of which may be utilized in order to determine a total potential exposure to the entity of the security threat should a loss event occur.

Block 260 of FIG. 3, further illustrates determining and/or editing an information security threat plan for the third party based on the determination of the security threats (e.g., individual threats, an information security threat level, or the like) for the third party as determined from block 250. The security threat plan may include a determination of the one or more ongoing assessments and the frequency of such one or more assessments for the third party. Moreover, the plan may further include security threat controls that include mitigation processes and features that should be implemented to mitigate potential security threats. The security threat controls will be described in further detail later, however, the controls may comprise, for example, requiring two factor authentication processes to access data, storing information anonymously and decryption separately, requiring information scans when accepting or sending electronic communications, restricting transfer of data through various formats, or the like. The plan, or parts thereof, may at least be determined automatically based on specific security threats, the information security threat level, or the like. That is, in some embodiments identification of specific security threats and/or a determination of a particular security threat level may result in the implementation of specific security controls. Alternatively, the security controls may be implemented on a case by case basis.

Block 270 illustrates that in some embodiments, the security threat assessment engine 140 is utilized to automatically, and continuously or intermittently, monitor security threats by analyzing the security threats of third parties on an ongoing basis. As such, the external data 110 and the internal data 120 may be monitored in real time, or intermittently, in order to determine any changes in any of the external data 110 and/or the internal data 120. When any changes in the data occur, the security threat assessment engine 140 may automatically determine any changes in security threats (e.g., determine potential individual security threats, an updated security threat level, or the like). Additionally, or alternatively, as will be discussed in further detail with respect to FIG. 4, if the analytics engine 150 determines that the security threat assessment engine 140 needs updating, the security threat assessment engine 140 may be updated and/or the security threats re-evaluated using the updated security threat assessment engine 140 (e.g., regardless of whether or not the external and/or internal data changes) in order to more accurately identify updated security threats (e.g., an updated security threat level for a third party).

In some embodiments it should be understood that the determination of a particular security threat, determining that the third party has reached a specific security threat level, and/or verification of the occurrence of an incident related to a security threat may result in automatically preventing the use of applications and/or systems, or portions thereof, associated with a third party. For example, when a particular application and/or system of a third party has an incident, which may result in a loss event, and/or a security threat level (e.g., as determined by the security threat assessment engine 140) reaches a particular level (e.g., threshold level), use or access of the affected application and/or system, or portions thereof, may be automatically prevented until the incident can be investigated. In some embodiments of the invention, if the use of, or access to, the application and/or systems cannot be prevented (e.g., it is a necessary application and/or system), the application and/or system may be monitored more closely after the occurrence of an incident, an identification of a security threat, and/or a reaching a particular security threat level.

FIG. 4 illustrates a process for utilizing an analytics engine 150 to improve upon the security threat assessment engine 140. As illustrated by block 310 in FIG. 4, the external data 110 is monitored in order to determine if there are any changes with respect to any of the third parties. For example, the entity systems 10 may receive the external data 110 from the external data source systems 40 continuously and/or intermittently. Alternatively, the data source systems 40 may contact the entity systems 10 only when there has been a change in the external data 110 for one or more of the third parties. For example, the external data sources may determine that incidents occurred (e.g., that the entity may not know about) with a particular third party that changes a security threat summary of the third party (e.g., external third party threat level), which is then provided to the entity systems 10 in order to make the entity aware of the incidents and/or the updated security threat summary.

Block 320 further illustrates in FIG. 4, that the third party applications and/or systems are monitored (e.g., continuously in real-time and/or in periodic intervals) in order to identify any incidents. As such, the one or more entity systems 10 will monitor the applications and/or systems that it utilizes with or from the third party in order to determine if there are any incidents (e.g., attempted compromises, actual compromises, or the like of the applications and systems). The applications and/or systems provided by the third party may be located on the one or more entity systems 10, and thus, monitored internally, or the one or more entity systems 10 may access the applications and/or systems that the entity utilizes but that the third party still controls by accessing the third party systems 30.

FIG. 4 further illustrates in block 330 that procurement is monitored for any changes in third party assessments. Procurement may supervise the assessments of the third parties (e.g., the assessment type, the assessment frequency, or the like). As such, should there be any changes in the assessment type, assessment frequency, or the results of the assessments for any third party, then the entity systems 10 may capture the changes. Moreover, procurement is tasked with procuring new applications and/or systems, and as such utilizing new applications and/or systems that interact with current applications and/or systems my affect the security threats of the current applications and/or systems (e.g., the new applications and/or systems may make the currently applications and/or systems more or less vulnerable). In some embodiments, the one or more entity systems 10 may monitor the applications and/or systems for any changes made by procurement, or procurement may notify the one or more entity systems 10 when there is a change in the assessment of a third party associated with an application and/or system, and/or when a new or updated version of an application and/or system is procured that affects a current application and/or system.

Block 340 illustrates that the security threat assessment engine 140 is utilized in order to determine any changes in the security threats, including any changes in the information security threat level, based on monitoring of the external data 110 and the internal data 120 (e.g., the internal incidents, the procurement information, and/or the like). The updated security threats are determined in the same way that the security threats were determined as previously described herein with respect to FIG. 3.

As illustrated in block 350, the analytics engine 150 may be utilized in order to determine patterns in the security threat determination, including the information security threat level. In some embodiments, the analytics engine 150 examines the historical determination of security threats for a plurality of third parties over time, as compared to the occurrence of incidents (e.g., that may or may not have resulted in loss events) that occurred for each of the plurality of third parties. In this way, the analytics engine 150 may identify the accuracy of the security threats determined by the security threat assessment engine 140. For example, the security threat assessment engine 140 may be accurate at predicting electronic communication incidents, but it may not be accurate at predicting encryption incidents. In this way, the analytics engine 150 may identify this pattern so that the security threat assessment engine 140 may be edited. In other embodiments, the analytics engine 150 may be used to determine patterns in the correlation between the individual assessment inquires related to the security threats with the actual incidents in order to determine if the right assessment inquiries are being made. For example, responses to a particular assessment inquiry may not identify a potential security threat associated with access to a particular database, but incidents for that database have occurred. As such, the particular assessment inquiry may not be properly capturing the potential security threat. The analytics engine 150 may also be utilized to examine the assessments of various assessors in order to determine if particular assessors are good at identifying some security threats, but not others, in order to improve training for the assessors (e.g., for types of security assessment, the assessment process, or the like), shift assessors to assessing different third parties, and/or to update the assessments inquiries. For example, should a plurality of third parties have the same types of incidents related to electronic correspondence, and the same assessor assessed each of the third parties, the assessor may need more training in electronic security. Moreover, should the responses to assessment inquiries from the same assessor be the same, short, and/or absent, the assessor may need additional training.

As such, the analytics engine 150 may identify how the security threat assessment engine 140 may be updated in order to more accurately predict the security threats. For example, the inputs, weighting of the inputs, and/or the determination of the security threats using the security threat assessment engine 140 may be altered in a way that more accurately predicts the incidents that actually occurred for the third party. Over time the analytics engine 150 may be able to refine the security threat assessment engine 140 to be more accurate at predicting potential security threats. In some embodiments, the analytics engine 150 utilizes machine learning over time in order to determine the refinement of the security threat assessment engine 150.

FIG. 4 further illustrates in block 360 that the security threat assessment engine 140 may be edited (e.g., manually or automatically) based on the refinement determination described with respect to block 350. For example, the inputs, the weighting factors, the assessment information (e.g., assessment inquiries, or the like) may be edited based on the analytics engine 15 (e.g., patterns in the accuracy of the assessment engine 150). It should be understood that the security threat assessment engine 150 may be refined many times as the security threat assessment engine 140 is used over time based on updated external data 110 and internal data 120, and as the analytics engine 150 continues to compare actual incidents with identified security threats and re-evaluates the accuracy of the security threat assessment engine 140.

Block 370 of FIG. 4 illustrates that the updated security threat assessment engine 140 may be utilized in order to determine if the information security threat level has changed for any third parties (e.g., third party applications and/or third party systems). For example, when the security threat assessment engine 140 changes based on the analytics engine 150, then the updated threat assessment engine 140 may be re-run for each of the third parties, or specific third parties that may have higher potential security threats (e.g., as determined by the previous versions of the security threat assessment engine 140, as identified by assessors, as identified by external data sources, or the like). As such, in some cases the entity systems 10 may re-run the security threat assessment engine 140 for the third parties (or for individual systems and/or applications of the third parties) that have the highest security threat level (e.g., top 5, 10, 15, 20, 25, 30, 35, 40, 45, or 50 percent security threat level).

Moreover, as illustrated by block 375 in FIG. 4, the assessment plans for the third parties may be edited based on the results determined by re-running the updated security threat assessment engine 140. For example, the type and frequency of the assessments for a third party may be changed based on the security threats (e.g., new security threat level) identified by the updated security threat assessment engine 140. Alternatively, or additionally, security controls may be changed. For example, authentication factors required may be changed, scanning of files being transferred may receive more scrutiny, the employees may be subjected to less or more training, or the like. Moreover, as previously discussed the applications and/or systems, or portions thereof, provided by the third party may be automatically shut down or monitored more closely in response to identifying additional security threats and/or identifying a change in the security threat level based on the updated security threat assessment engine 140.

Block 380 of FIG. 4 illustrates that new third parties (e.g., new third party applications and/or systems) may be evaluated based on the updated information threat assessment engine 140. For example, the when procurement is planning on utilizing products from a new third party or utilizing new or updated applications and/or systems from a current third party, the present invention may evaluate the new or current third party, or applications or systems thereof, using the updated security threat assessment engine 140.

Block 385 of FIG. 4 illustrates that decisions regarding the third party (e.g., the third party applications and/or systems) may be made based on the evaluation of the new third parties, and/or new applications and/or systems of current third parties, using the updated information threat assessment engine 140. The decisions may include deciding whether or not to enter into a contract, determining the type of assessments, when to schedule the assessments, the frequency of assessments, determining what security controls to implement, or other like decision previously discussed when determining when to use the security threat assessment engine 150.

As illustrated in FIG. 2, the security threat assessment engine 140 and/or the analytics engine 150 may be utilized for the entity's information security threat platform 160 and/or the entity decisioning platform 170. For example, as previously discussed herein, the security threat assessment engine 140 and/or analytics engine 150 may be utilized to provide third party information security assessment data 162 (e.g., assessment data, security threats, and/or security threat levels for various third parties), to provide third party information security management 164 (e.g., determine the security controls to require for particular third parties and the associated applications and/or systems), and/or to provide third party information security remediation (e.g., remediation planning should a security threat result in an actual incident). Moreover, as previously discussed herein, the security threat assessment engine 140 and/or analytics engine 150 may be utilized to provide third party decisioning 172 (e.g., what applications and/or systems to utilize from what third parties based on the potential security threats of each), and/or to provide assessment decisioning 174 (e.g., the assessment type and/or assessment frequency for the third parties).

It should be understood that the assessments and/or the determination of the security threats may result in the implementation of security controls. As such, the results of the assessments may provide information on whether or not various security controls require implementing. As such, the assessment may relate to and/or result in security controls for implementing a business recovery plan (e.g., actions to take in response to a security threat) and/or a technical recovery plan (e.g., technical actions to take in response to a security threat); mitigating potential security threats associated with the third party licensing various functions (e.g., security around use of licensed applications and/or systems); recovery time requirements in place for various levels of incidents (e.g., essential incidents corrected in 8 hours, non-essential incidents corrected in one week); perform business impact analysis of potential security threats (e.g., how incidents will affect the business); back up plans are tested regularly (e.g., regular verification of back-up systems and/or applications); formal change management procedures are outlined for any application or system changes (e.g., logging of application and/or system changes); remote access is properly encrypted; relevant internal and external communications use an approved proxy service; monitoring of the electronic communications for confidential information of the entity; monitoring and controlling write privileges to external drives; the devices within the business include anti-virus technology; employee access privileges are routinely checked and monitored; access to physical secure servers is monitored by surveillance; testing is not performed using live data; entity data separated from other party data; access to data requires multifactor authentication; password requirements are instituted; encryption access is split to require multiple people in order to access such information; monitoring of security log information occurs; and/or the like.

It should be further understood that in some embodiments of the invention the security threat level described herein may include a ranking of the third party with respect potential security threats. In embodiments of the invention, the ranking may include a general ranking (e.g., high, medium, low, or the like), a specific score, or the like. In some embodiments a score may be based on the external data 110 and the internal data 120. In some embodiments the score may be a measurement of the likelihood of having a security threat event. In some embodiments, the score may be based on scoring of the weighted factors of the external data 110 and the internal data 120.

It should be understood that the present invention improves traditional security threat systems by not only utilizing internal data regarding applications and/or systems of third parties, but also by accessing external data from outside data sources in order to supplement the internal data that is available to the entity. The combination of the internal and external data is utilized to more accurately identify potential security threats of a third party that may supply products to the entity. The present invention also is able to predict how likely the security threats identified will result in an incident in the future (e.g., within the weeks, months, years, or the like). Moreover, the determination of the security threats helps the entity to determine plans for mitigating and/or eliminating the security threats by implementing security controls. Furthermore, continuous monitoring of the security threats (e.g., based on continuous monitoring of the external and/or internal data) allows the entity to make decisions regarding how to mitigate potential incidents and/or whether or not to take specific actions with respect to third parties. For example, as the external data and/or internal data changes, which may result in the identification and/or removal of security threats for different third parties, the present invention may automatically take actions with respect to the third party. For example, when a security threat and/or specific incident is identified, the present invention may automatically prevent access to and/or use of the applications and/or system for which the security threat was identified. In other embodiments, the present invention may automatically implement security controls for the application and/or system (e.g., change assessment type, change assessment frequently, change assessors, or the like). As such, the present invention allows for real-time management of security threats and implementation of security controls in order to prevent potential incidents (e.g., misappropriation of data by compromising entities, loss of confidential information, or the like). The present invention is an improvement over traditional systems because of the use of the external data, and the real-time monitoring of the security threats, which results in more accurate determination of security threats and more efficient mitigation of such security threats.

It should be further understood that changes in the external data and internal data, as well as the resulting changes in the security threats, may be monitored over time in order to improve upon the accuracy of the determination of the security threats. For example, the monitoring may allow for the determination of patterns in the accuracy of identifying security threats that results in the reduction of the occurrence of incidents. Moreover, the monitoring may help to determine patterns in the correlation between the individual assessment inquires related to the security threats with the actual incidents in order to determine if the right assessment inquiries are being made and the right security controls are being implemented. The present invention may also be utilized to examine the assessments of various assessors in order to determine if particular assessors are good at identifying some security threats, but not others, in order to improve training for the assessors (e.g., for types of security assessment, the assessment process, or the like), shifting assessors to assessing different third parties, and/or to updating the assessments inquiries.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems, devices, or components thereof described herein.

It should be understood, that the systems, devices, and components described in FIGS. 1 and 2, or other devices not specifically described herein, may be configured to establish an electronic communications link with each other in order to accomplish the steps of the processes described herein. The link may be an internal link within the same systems or an external link with the other systems of other parties. The information provided by the systems may be made continuously available, however, continuously available does not necessarily mean that the sources actually continuously generate data, but that a sources are continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format.

Moreover, it should be understood that the process flows described herein include transforming the information sent and/or received from the applications of the different systems (e.g., internally or externally) from one or more data formats into a data format associated with each individual system. There are many ways in which information is converted within the system environment 1. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In accordance with embodiments of the invention, the term organization entity may relate to a "financial institution" and/or "financial entity", which includes any organization that processes financial resource transfers including, but not limited to, banks, credit unions, savings and loan associations, investment companies, stock brokerages, assess management firms, insurance companies and the like. In specific embodiments of the invention, use of the term "bank" may be limited to a financial entity in which account-bearing customers conduct financial resource transfers, such as account deposits, withdrawals, transfers and the like. Moreover, the term organization entity may be a third party acting on behalf of the financial institution and/or financial entity.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It should be understood that "operatively coupled," when used herein, means that the components may be formed integrally with each other, or may be formed separately and coupled together. Furthermore, "operatively coupled" means that the components may be coupled directly to each other, or to each other with one or more components located between the components that are operatively coupled together. Furthermore, "operatively coupled" may mean that the components are detachable from each other, or that they are permanently coupled together.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 7669US1.014033.3125 | 15/827,094 published as U.S. Patent Publication No. 2019/0166154 | SYSTEM FOR INFORMATION SECURITY THREAT ASSESSMENT BASED ON DATA HISTORY | Concurrently herewith |
| 8111US1.014033.3128 | 15/827,292 published as U.S. Patent Publication No. 2019/0166155 | SYSTEM FOR GENERATING A COMMUNICATION PATHWAY FOR THIRD PARTY VULNERABILITY MANAGEMENT | Concurrently herewith |
| 8112US1.014033.3127 | 15/826,979 published as U.S. Patent Publication No. 2019/0166153 | INFORMATION SECURITY VULNERABILITY ASSESSMENT SYSTEM | Concurrently herewith |

| Docket Number | U.S. patent application Ser. No. | Title | Filed On |
| --- | --- | --- | --- |
| 8132US1.014033.3133 | 15/826,893 published as U.S. Patent Publication No. 2019/0166152 | SYSTEM FOR INFORMATION SECURITY THREAT ASSESSMENT | Concurrently herewith |
| 8135US1.014033.3134 | 15/827,515 published as U.S. Patent Publication No. 2019/0163916 | DATA INTEGRATION SYSTEM FOR TRIGGERING ANALYSIS OF CONNECTION OSCILLATIONS | Concurrently herewith |
| 8136US1.014033.3135 | 15/827,0.4 published as U.S. Patent Publication No. 2019/0163914 | SYSTEM FOR INFORMATION SECURITY THREAT ASSESSMENT AND EVENT TRIGGERING | Concurrently herewith |

What is claimed is:

1. An information security threat assessment system for allowing an entity to determine information security threats of third parties, the system comprising:
   one or more memory components having computer readable code stored thereon; and
   one or more processing components operatively coupled to the one or more memory components, wherein the one or more processing components are configured to execute the computer readable code to:
   identify external data for a third party, wherein the external data comprises at least third party security threat data for the third party from an external data source, wherein the third party security threat data comprises at least external incident data and external communications of the third party over the Internet, and wherein the external data is received from an external data source system;
   identify internal data for the third party, wherein the internal data comprises:
      third party product data for the third party;
      internal incident data related to the third party; and
      assessment data from an assessment of the third party and assessment type, wherein the assessment data comprises responses to assessment inquiries regarding security of the third party, and wherein the assessment type is a self-assessment, an online assessment, or an onsite assessment at the third party;
   determine one or more security threats for the third party based on the external data and the internal data; and
   determine an information security threat plan based on the one or more security threats, wherein the information security threat plan comprises determining at least the assessment type and an assessment frequency for future assessments of the third party.

2. The system of claim 1, wherein the one or more security threats for the third party comprises at least an information security threat level for the third party based on the external data and the internal data.

3. The system of claim 1, wherein identifying the external communications of the third party over the Internet comprises monitoring a number of communications with the third party, a communication type, and a communication request.

4. The system of claim 3, wherein the information security threat plan further comprises security controls for implementation by the third party to mitigate the one or more security threats.

5. The system of claim 1, wherein the third party security threat data is determined by the external data source from Internet traffic of the third party.

6. The system of claim 1, wherein the third party product data for the third party comprises a scan of a third party product.

7. The system of claim 1, wherein the third party product data for the third party comprises an allowed compromise of a third party product.

8. The system of claim 1, wherein the external incident data and the internal incident data related to the third party comprises a number of incidents and a severity of incidents associated with the third party.

9. The system of claim 1, wherein the assessment data from the assessment of the third party comprises the assessment data for one or more past assessments of the third party.

10. The system of claim 9, wherein the one or more past assessments comprise a determination of the one or more security threats based on responses to assessment inquiries regarding security of the third party.

11. The system of claim 2, wherein the one or more processing components are configured to execute the computer readable code to:
   receive a request to determine the one or more security threats for the third party, wherein the request is received pre-interaction with the third party, post-interaction with the third party, pre-assessment scheduling, pre-assessment support, post-assessment support, remediation support, assessor evaluation, or business decision support.

12. A computer implemented method for an information security threat assessment system for allowing an entity to determine information security threats of third parties, the method comprising:
   identifying, by one or more processing components, external data for a third party, wherein the external data comprises at least third party security threat data for the third party from an external data source, wherein the third party security threat data comprises at least external incident data and external communications of the third party over the Internet, and wherein the external data is received from an external data source system;
   identifying, by the one or more processing components, internal data for the third party, wherein the internal data comprises:
      third party product data for the third party;
      internal incident data related to the third party; and
      assessment data from an assessment of the third party and assessment type, wherein the assessment data comprises responses to assessment inquiries regarding security of the third party, and wherein the assessment type is a self-assessment, an online assessment, or an onsite assessment at the third party; and determining, by the one or more processing components, one or more security threats for the third party based on the external data and the internal data; and determining, by the one or more processing components, an information security threat plan based on the one or more security threats, wherein the information security threat plan comprises determining at least the assessment type and an assessment frequency for future assessments of the third party.

13. The method of claim 12, wherein the one or more security threats for the third party comprises at least an information security threat level for the third party based on the external data and the internal data.

14. The method of claim 12, wherein identifying the external communications of the third party over the Internet comprises monitoring a number of communications with the third party, a communication type, and a communication request.

15. The method of claim 14, wherein the information security threat plan further comprises security controls for implementation by the third party to mitigate the one or more security threats.

16. The method of claim 12, wherein the third party security threat data is determined by the external data source from Internet traffic of the third party.

17. The method of claim 12, wherein the third party product data for the third party comprises a scan of a third party product or an allowed compromise of the third party product, wherein the external incident data and the internal incident data related to the third party comprises a number of incidents and a severity of incidents associated with the third party, wherein the assessment data from the assessment of the third party comprises the assessment data for one or more past assessments of the third party.

18. The method of claim 13, further comprising:
receiving, by the one or more processing components, a request to determine the one or more security threats for the third party, wherein the request is received pre-interaction with the third party, post-interaction with the third party, pre-assessment scheduling, pre-assessment support, post-assessment support, remediation support, assessor evaluation, or business decision support.

19. A computer program product for an information security threat assessment system for allowing an entity to determine information security threats of third parties, the computer program product comprising at least one non-transitory computer-readable medium having computer-readable program code portions embodied therein, the computer-readable program code portions comprising:

an executable portion configured to identify external data for a third party, wherein the external data comprises at least third party security threat data for the third party from an external data source, wherein the third party security threat data comprises at least external incident data and external communications of the third party over the Internet, and wherein the external data is received from an external data source system;

an executable portion configured to identify internal data for the third party, wherein the internal data comprises:
third party product data for the third party;
internal incident data related to the third party; and
assessment data from an assessment of the third party and assessment type, wherein the assessment data comprises responses to assessment inquiries regarding security of the third party, and wherein the assessment type is a self-assessment, an online assessment, or an onsite assessment at the third party; and an executable portion configured to determine one or more security threats for the third party based on the external data and the internal data; and an executable portion configured to determine an information security threat plan based on the one or more security threats, wherein the information security threat plan comprises determining at least the assessment type and an assessment frequency for future assessments of the third party.

\* \* \* \* \*